United States Patent
Wong (10) Patent No.: US 7,691,452 B1
(45) Date of Patent: Apr. 6, 2010

(54) ANTI-CONTAMINATION COATED MULTI-LAYER INSULATION

(75) Inventor: Hamilton Wong, Skillman, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 224 days.

(21) Appl. No.: 11/750,253

(22) Filed: May 17, 2007

Related U.S. Application Data (62) Division of application No. 10/790,591, filed on Mar. 1, 2004, now Pat. No. 7,252,890.

(51) Int. Cl.
   B05D 5/05 (2006.01)
   B05D 5/12 (2006.01)
   B05D 3/06 (2006.01)

(52) U.S. Cl. .................. 427/553; 427/162; 427/404; 427/419.3; 427/419.2

(58) Field of Classification Search .............. None
   See application file for complete search history.

(56) References Cited

U.S. PATENT DOCUMENTS

| | | | |
|---|---|---|---|
| 4,489,906 A | 12/1984 | Fellas | |
| 5,143,770 A | 9/1992 | Gonczy et al. | |
| 5,373,305 A | 12/1994 | Lepore, Jr. et al. | |
| 5,598,989 A | 2/1997 | Ross et al. | |
| 5,608,414 A | 3/1997 | Amore | |
| 5,651,256 A | 7/1997 | Herd et al. | |
| 6,290,180 B1 * | 9/2001 | Browall et al. | 244/171.7 |
| 6,521,077 B1 | 2/2003 | McGivern et al. | |
| 6,573,650 B2 * | 6/2003 | Aoki et al. | 313/503 |
| 6,949,284 B2 | 9/2005 | Yoshihara et al. | |
| 2003/0039848 A1 | 2/2003 | Murata et al. | |
| 2003/0143437 A1 * | 7/2003 | Ohtsu et al. | 428/701 |

(Continued)

FOREIGN PATENT DOCUMENTS

JP    10-212771 A  *  8/1998

(Continued)

OTHER PUBLICATIONS

Machine translation of JP 2004/028386 A, cited above.*

(Continued)

Primary Examiner—Marianne L Padgett
(74) Attorney, Agent, or Firm—McDermott Will & Emery LLP (57) ABSTRACT

A multi-layer insulation (MLI) blanket with enhanced contamination inhibiting properties and a method for inhibiting the formation of organic residues on the outer surface of a MLI blanket are provided. In one embodiment, a MLI blanket (10) attachable to a spacecraft or other structure includes a plurality of metallized layers (20, 30, 40, 50) separated by mesh layers (60, 62, 64). An anti-contamination coating (80) comprised of a photocatalytic material is disposed between a high emittance layer (70) that overlies the outer surface (20A) of the outer metallized layer (20) and an outer electrically conductive layer (90). When exposed to ultraviolet or near-ultraviolet radiation components present in solar radiation, the anti-contamination coating (80) catalyzes the breakdown of organic residues on the outer surface of the MLI blanket (10) thereby maintaining the reflective properties of the MLI blanket (10) and ensuring that solar absorptance of the MLI blanket (10) is maintained at or below an acceptable threshold level.

8 Claims, 6 Drawing Sheets

U.S. PATENT DOCUMENTS

| | | |
|---|---|---|
| 2004/0145314 A1* | 7/2004 | Zukawa et al. .............. 313/582 |
| 2004/0233552 A1* | 11/2004 | Tonar et al. ................. 359/838 |
| 2006/0029754 A1* | 2/2006 | Medwick et al. ............. 428/34 |
| 2007/0009745 A1* | 1/2007 | Hoffman .................... 428/426 |
| 2007/0042114 A1* | 2/2007 | Krisko et al. ................ 427/162 |
| 2008/0125838 A1* | 5/2008 | Francis ....................... 607/92 |

FOREIGN PATENT DOCUMENTS

| | | | |
|---|---|---|---|
| JP | 11-128750 A | * | 5/1999 |
| JP | 2002-045650 A | * | 2/2002 |
| JP | 2003-260371 | | 9/2003 |
| JP | 2004-028386 A | * | 1/2004 |
| JP | 2005-224698 A | * | 8/2005 |
| WO | 02/055612 | | 7/2002 |

OTHER PUBLICATIONS

Machine translation of JP 2002-045650 A, cited above.*

* cited by examiner

FIG.6

ANTI-CONTAMINATION COATED MULTI-LAYER INSULATION

RELATED APPLICATION INFORMATION

This application is a divisional of and claims priority from U.S. application Ser. No. 10/790,591, issued as U.S. Pat. No. 7,252,890 entitled "ANTI-CONTAMINATION COATED MULTI-LAYER INSULATION" filed on Mar. 1, 2004, which is incorporated by reference herein in its entirety.

FIELD OF THE INVENTION

The present invention relates generally to multi-layer insulation blankets used to insulate spacecraft and the like, and more particularly to improving the long-term effectiveness of multi-layer insulation blankets by inhibiting the presence of contaminants that can increase the solar absorptance of the blankets.

BACKGROUND OF THE INVENTION

Multi-layer insulation (MLI) blankets are useful in a number of applications. One application is insulating spacecraft. In this regard, remote sensing scientific spacecraft as well as commercial communications spacecraft require highly insulative MLI blankets to minimize undesirable heat intrusion and diurnal temperature swings. The insulative value of MLI blankets is generally determined by factors such as the overall number of layers included in the blanket, the extent of conductive shorting between adjacent layers, the quality of edge seams and closures, and the number and extent of penetrations through the blanket. However, these are not the only factors that can affect the insulative value of a MLI blanket.

The solar absorptance of the outer layer of a MLI blanket is also an important factor in determining the overall insulative value of the MLI blanket. In this regard, limited attention has been paid to the optical properties of the outer layer of MLI blankets, other than typically designing the blanket to achieve a high infrared emittance value of approximately 0.80. However, the solar absorptance of the outer layer, either after long-term contamination and ultraviolet (UV) degradation effects or due to inherent beginning-of-life (BOL) properties typically approaches the infrared emittance value, yielding an equivalent black body surface with steady-state temperatures of around 125° C. when directly illuminated with solar radiation in space.

SUMMARY OF THE INVENTION

Accordingly, the present invention provides a MLI blanket and related method of improving a MLI blanket that ensures that the solar absorptance of the MLI blanket is maintained at or below an acceptable threshold level. This is accomplished through the use of an anti-contamination coating that reduces the presence of organic residues and the like on the outer layer of the MLI blanket. This ensures that the reflective properties of the MLI blanket are maintained so that a sufficient amount of solar radiation incident on the MLI blanket is reflected and only a limited amount is absorbed. This improves the efficiency of the MLI blanket by reducing heat flux due to solar radiation, preventing such heat from being absorbed by the MLI blanket outer layer before it can conduct or radiate through the internal layers of the MLI blanket. Reducing the amount of heat absorbed by the MLI blanket due to solar radiation allows fewer insulative layers to be incorporated into the construction of the MLI blanket while still maintaining the same insulative capability as compared to a conventional MLI blanket with additional insulative layers required to compensate for the increased heat flux due to solar radiation. Having fewer layers in the MLI blanket provides several advantages including, for example, increased conformability to the contour of the spacecraft or other structure, lower weight, and less manufacturing complexity and cost.

In accordance with one aspect of the present invention, a MLI blanket attachable to a structure intended for use in vacuum conditions includes an outer sheet of thermally insulative plastic material and one or more inner sheets of thermally insulative plastic material between the outer sheet and the structure when the MLI blanket is attached to the structure. In this regard, the structure may comprise a spacecraft such as, for example, a communications or remote sensing satellite. However, the structure may comprise other types of spacecraft as well as possibly even terrestrial structures utilized in artificial vacuum conditions. The outer sheet and inner sheet(s) are typically coextensive with one another. Furthermore, there may be one or more layers of lightweight material (e.g., glass fiber or nylon mesh or netting) between each adjacent sheet that maintain spacing between the sheets and inhibit undesired physical contact between adjacent sheets. Also, a layer of reinforcement material (e.g., glass fiber, nylon mesh, or netting) may be bonded to one or more sheets to provide strengthening of the blanket and to prevent the propagation of tears.

The outer sheet includes a reflective surface on a side thereof facing away from the structure (e.g., the space facing side) when the multi-layer insulation blanket is attached to the structure. In this regard, the outer sheet of thermally insulative plastic material may, for example, comprise metallized polyimide material or metallized polyester material, with the metallization typically being on at least the outer surface thereof and preferably on both sides thereof. The inner layer(s) may, for example, comprise polyimide material or polyester material, which may or may not be metallized on one or both sides thereof. A coating of anti-contaminant material overlies the reflective surface of the outer sheet. In addition to the coating of anti-contaminant material, there may typically be a high emittance layer between the reflective surface and the coating of anti-contaminant material. Also, there may be an electrically conductive layer, either overlying the layer of anti-contaminant material or between the coating of anti-contaminant material and the high emittance layer.

The coating of anti-contaminant material comprises a material that is effective to induce the breakdown of organic residues on the outer surface of the outer sheet when the MLI blanket is exposed to ultraviolet or near-ultraviolet radiation (e.g., when the spacecraft is exposed to solar radiation during portions of the spacecraft's orbit when it is out of the Earth's shadow). In this regard, the anti-contaminant material may comprise a photocatalytic material, such as, for example, a photoactive transition metal oxide. Such photocatalytic materials catalyze the breakdown of organic residues by generating free carriers when exposed to UV or near-UV radiation. The resulting conduction-band electrons and valence-band holes interact with bound oxygen in the organic residues to form radicals and thereby break down the organic residues.

In accordance with another aspect of the present invention, a method for inhibiting the formation of organic residues on the outer surface of a MLI blanket attachable on a structure intended for use in vacuum conditions includes the step of coating an outer surface of an outer layer of the MLI blanket that faces away from the structure when the multi-layer insulation blanket is attached to the structure with a photocatalytic material. In this regard, the photocatalytic material may comprise a photoactive transition metal oxide. Generally, the photocatalytic material is coated over a high emittance layer or over an electrically conductive layer on the outer surface of the outer layer of the MLI blanket. Thereafter, the photocatalytic material coated outer surface of the outer layer of the MLI blanket is exposed to ultraviolet radiation and/or near-ultraviolet radiation to activate the photocatalytic material to catalyze the breakdown of organic residues on the outer surface of the outer layer of the MLI blanket. In one embodiment of the method, the structure comprises a spacecraft, and the step of exposing the photocatalytic material coated outer surface of the MLI blanket comprises exposing the spacecraft to solar radiation in space.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
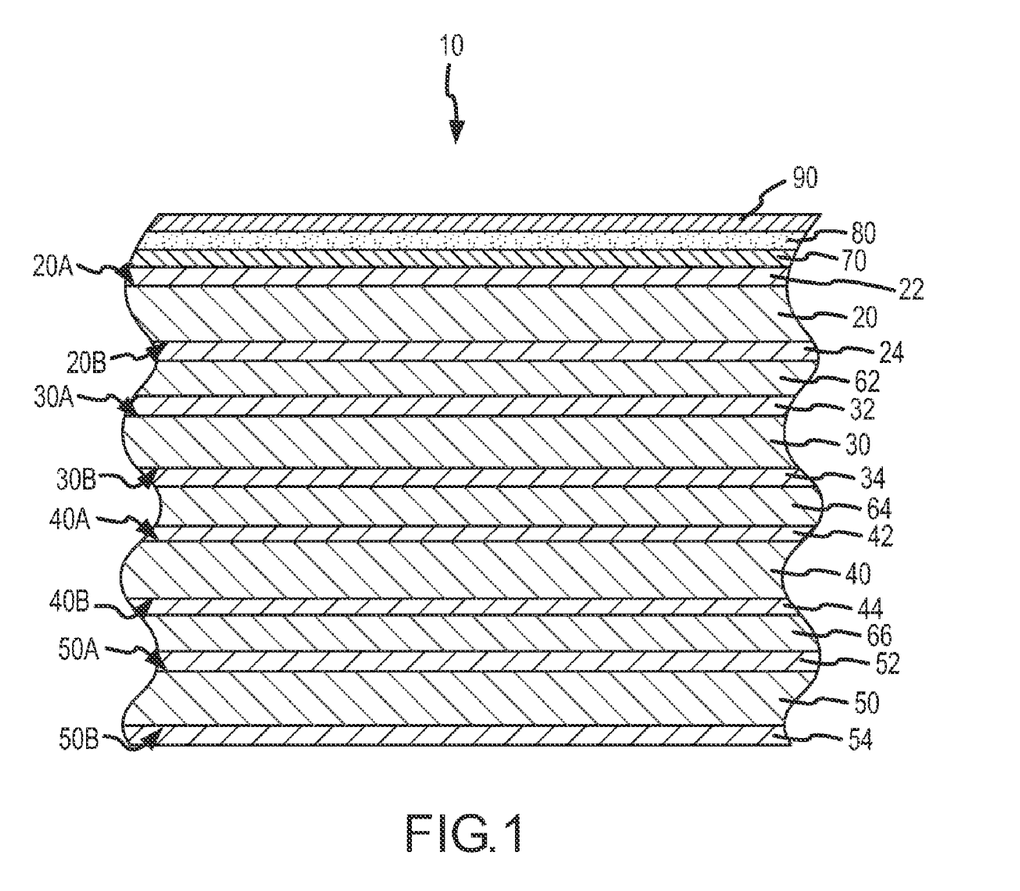
FIG. 1 a cross-sectional view of one embodiment of a MLI blanket in accordance with the present invention.

FIG. 1 shows a cross-sectional view of one embodiment of an improved MLI blanket 10 in accordance with the present invention. In FIG. 1, the relative thickness of the various layers may not necessarily be depicted to scale. The MLI blanket 10 includes a plurality of coextensive sheets 20, 30, 40, 50 of a flexible thermally insulative plastic material such as, for example, polyimide (e.g., Kapton®) or polyester (e.g., Mylar®).

One or more of the sheets 20, 30, 40, 50 may be coated on one or both sides with a reflective metallic material such as, for example, aluminum, silver, or other appropriate metals or alloys thereof. In this regard, the sheets 20, 30, 40, 50 of coated thermally insulative plastic material may also be referred to herein as the metallized layers 20, 30, 40, 50.

In the embodiment illustrated, the first or outermost metallized layer 20 comprises a sheet of Kapton® or Mylar® with a silver coating 22 on the outer side 20A and an aluminum coating 24 on the inner side 20B of the sheet 20. The silver coating 22 on the outermost side 20A of sheet 20 provides the MLI blanket 10 with, among other properties, an outer surface that is reflective to solar radiation and eliminates the problem of UV and electron-proton darkening of the Kapton® or Mylar® substrate. The metallized second layer 30 also comprises a sheet of Kapton® or Mylar® having aluminum coatings 32, 34 on the outer and inner sides 30A, 30B of the sheet 30. The third layer 40 comprises a sheet of Kapton® or Mylar® having aluminum coatings 42, 44 on the outer and inner sides 40A, 40B of the sheet 40. The fourth or innermost metallized layer 50 comprises a sheet of Kapton® or Mylar® having aluminum coatings 52, 54 on the outer and inner sides 50A, 50B of the sheet 50. Although the metallized layers 20, 30, 40, 50 in the presently described embodiment consist of a Kapton® or Mylar® substrate metallized with aluminum on both sides thereof, the metallized layers 20, 30, 40, 50 may in general be comprised of any suitable flexible thermally insulative plastic substrate that is metallized with an appropriate low emittance material on one or both sides thereof. Where desired, one or more of the metallized layers 20, 30, 40, 50 may be loaded with carbon or the like to reduce its transparency.

Between adjacent metallized layers 20, 30, 40, 50 there are mesh or netting layers 60, 62, 64 comprised of, for example, glass fiber, nylon, or other low conductivity materials. The mesh layers 60, 62, 64 maintain spacing between adjacent metallized layers 20, 30, 40, 50 to reduce undesired contact there between that results in undesired enhanced heat conductivity through the MLI blanket 10. Although FIG. 1 shows a MLI blanket 10 having four metallized layers 20, 30, 40, 50, in other embodiments, MLI blankets in accordance with the present invention may have fewer or more metallized layers. Also, in other embodiments, there may be no mesh layer or more than one mesh layer between adjacent metallized layers. Further, there may also be layers of reinforcement material (not shown) bonded to one or more of the Kapton® or Mylar® sheets 20, 30, 40, 50.

Overlying the silver coating 22 on the outer surface 20A of the outermost metallized layer 20 there is a high emittance layer 70 that helps maintain the infra-red emissivity of the MLI blanket 10 on the order of about 0.80. The high emittance layer 70 is comprised of a material such as, for example, quartz, glass, silicon nitride, or silicon oxy-nitride, that is generally transparent to solar radiation and is relatively impervious to the deleterious effects of UV, proton, and electron radiation. The high emittance layer 70 should be of an appropriate thickness to provide needed flexibility, solar transparency and infra-red emissivity on the order of 0.80. In this regard, the high emittance layer is generally in the range of 15 to 50 µm thick, and is most typically about 25 µm thick.

Overlying the high emittance layer 70 is an anti-contamination coating 80 deposited thereon. The anti-contamination coating 80 is comprised of a photocatalytic material. A number of different photocatalytic materials are appropriate. For example, the photocatalytic material may be a semiconductor material selected from the group consisting of photoactive transition metal oxides, including, but not limited to $TiO_2$, ZnO, $WO_3$, $CaTiO_3$, $SnO_2$, $MoO_3$, $NbO_5$, $Fe_2O_3$, $Ta_2O_5$, and $Ti_x(Zr_{1-x})O_2$, where X has a value of between 0 and 1. Preferred photocatalytic materials are $TiO_2$, ZnO, $WO_3$. Compound semiconductors, including, but not limited to ZnS, ZnSe, and CdS are also useful photocatalytic materials. The anti-contamination coating 80 may be applied on the high emittance layer 70 overlying the silver coating 22 on the outer surface 20A of the outer metallized layer 20 as a thin film using any number of a variety of conventional techniques utilized in forming thin films during the fabrication of integrated circuits, including, but not limited to sputtering, chemical vapor deposition (CVD), plasma enhanced chemical vapor deposition (PECVD), and physical vapor deposition (PVD). Regardless of how it is applied, the anti-contamination coating 80 should not be so thick that it substantially interferes with the reflective properties of the outer surface 20A of the outer metallized layer 20. In this regard, the anti-contamination coating is preferably between about 2 nm and 200 nm thick, although the most desired thickness can vary based on factors such as the specific photocatalytic material employed and the durability required.

For spacecraft system applications requiring an electrically conductive or dissipative outer surface, the MLI blanket 10 may also include an electrically conductive layer 90 over the anti-contamination coating 80, such as is shown in FIG. 1. In some embodiments, the electrically conductive layer 90 may instead be between the anti-contamination coating 80 and the high emittance layer 70. Regardless of its location, the electrically conductive layer 90 is comprised of a transparent, electrically conductive material such as, for example, Indium Tin Oxide, Indium Oxide, or other equivalent materials. Typically the electrically conductive layer 90 is in the range of about 50 to 250 angstroms thick. Having the electrically conductive layer 90 on the outside allows for easy post-application electrical conductivity measurement. When the electrically conductive layer 90 is underneath the anti-contamination coating 80, the relatively thin anti-contamination coating 80 allows electrons incident on the MLI blanket 10 to burrow through the anti-contamination coating 80 into the electrically conductive layer 90.

Figure 2:
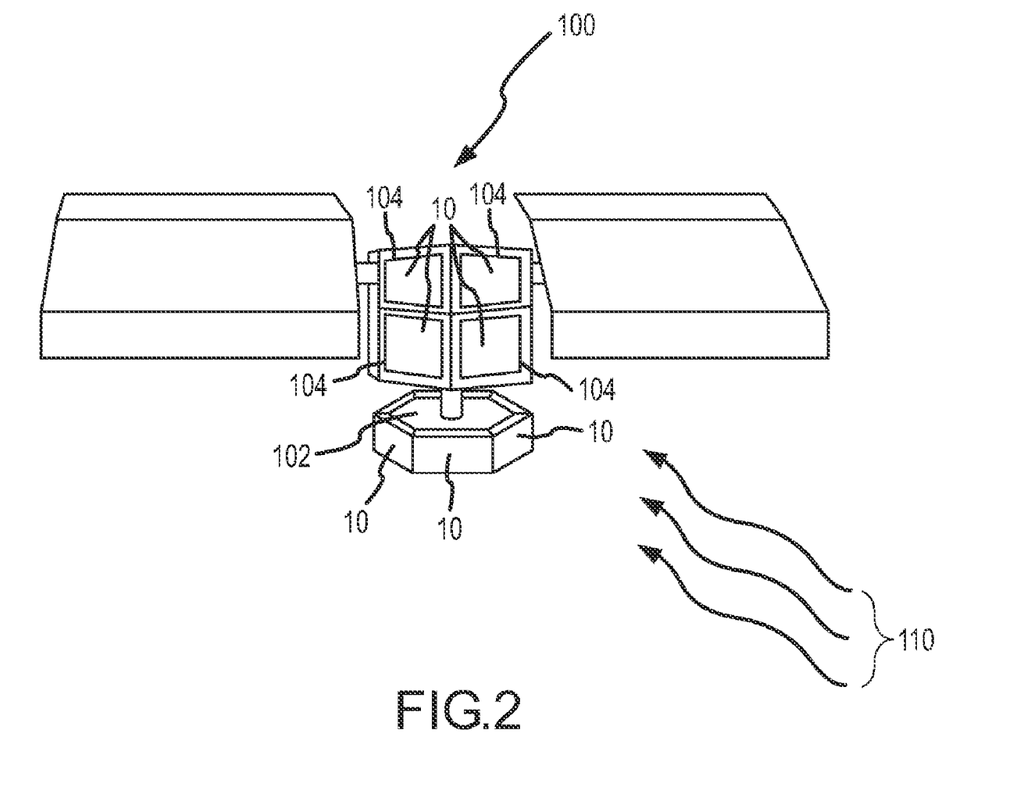
FIG. 2 a perspective view illustrating a typical communication satellite having MLI blankets attached thereon.

FIG. 2 shows a perspective view of a typical satellite communications spacecraft 100 upon which MLI blankets 10 such as shown in FIG. 1 are utilized to provide thermal protection for various portions of the spacecraft 100. The MLI blankets 10 are shaped to cover various portions of the spacecraft 100, including the sides of an antenna 102 and several panels 104 on the body of the spacecraft 100. The MLI blankets 10 are attached with the high emittance layer 70, anti-contamination coating 80, and electrically conductive layer 90, if any, facing outward (i.e., facing space) using, for example, hook and loop material (e.g. Velcro®), adhesive, pressure sensitive tape, or a combination of all. When the spacecraft 100 is in space, various portions of the spacecraft 100 can be exposed to substantial solar radiation 110 for various periods of time depending factors such as the orbital path and orientation of the spacecraft 100. The anti-contamination coating 80 reduces the solar absorptance of the outer metallized layer 20 of the MLI blankets 10 covering the various portions 102, 104 of the spacecraft 100. In this regard, the anti-contamination coating 80 preferably maintains the solar absorptance of the outer metallized layer 20 at a value of 0.12 or less. This results in an outer surface temperature of the MLI blankets 10 in space of −25° C., thereby reducing solar heat transmitted through the MLI blankets 10 by at least 50% as compared with similar thickness MLI blankets lacking the anti-contamination coating 80.

The anti-contamination coating 80 reduces the solar absorptance of the outer metallized layer 20 of the MLI blankets 10 by reducing the presence of organic residues on the outer metallized layer 20. Such organic residues can form from organic materials and the like present, for example, in the components of the spacecraft 100 (e.g., composite panels and members, electronic components), in paints used on the spacecraft 100, and in materials used in assembling the spacecraft 100 (e.g., sealants and adhesives), that are more readily vaporized in the vacuum conditions of space. The photocatalytic material comprising the anti-contamination coating 80 on the outer surface 20A of the outer metallized layer 20 is excited by the UV or near UV components of the solar radiation 110 to generate free carriers. The resulting conduction-band electrons and valence-band holes can then interact with bound oxygen in the organic residues to form radicals and thereby break down the organic contaminants so that they evaporate into space. By reducing the presence of organic residues on the outer surface 20A of the outer metallized layer 20, the reflective properties of the MLI blanket 10 are maintained thereby reducing solar absorptance.

EXAMPLES

The following examples illustrate certain aspects of the present invention such as the capability of decomposing organic materials via photocatalytic processes utilizing bound oxygen from absorbing residues in the vacuum conditions of space. The examples are not intended to be comprehensive of all features and all embodiments of the present invention, and should not be construed as limiting the claims presented herein. Furthermore, in the following examples, the various photocatalytic coatings were tested on quartz substrates such as may be employed in an optical solar reflector (OSR) as opposed to metallized Kapton®, Mylar®, or the like. However, similar results are anticipated for the photocatalytic coatings when used on metallized Kapton®, Mylar®, or the like. The experiments were performed under vacuum condition to simulate space environments, and a thermal quartz crystal microbalance (TQCM, sensitivity: 1.56 ng.$Hz^{-1}$.$cm^{-2}$) was employed to monitor organic contaminant deposition.

Example 1

Figure 3:
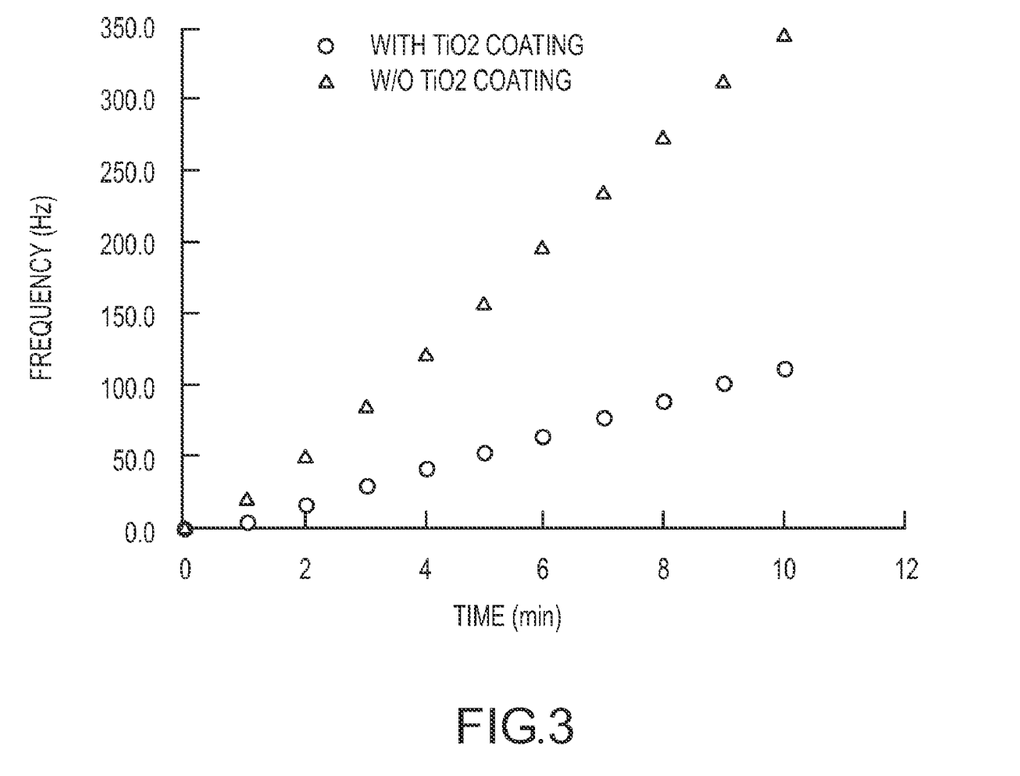
FIG. 3 is a graph showing frequency change (mass change) as a function of time under UV radiation illustrating the deposition rates of organic contaminants on a thermal quartz microbalance sensor both with and without a $TiO_2$ coating.
Figure 4:
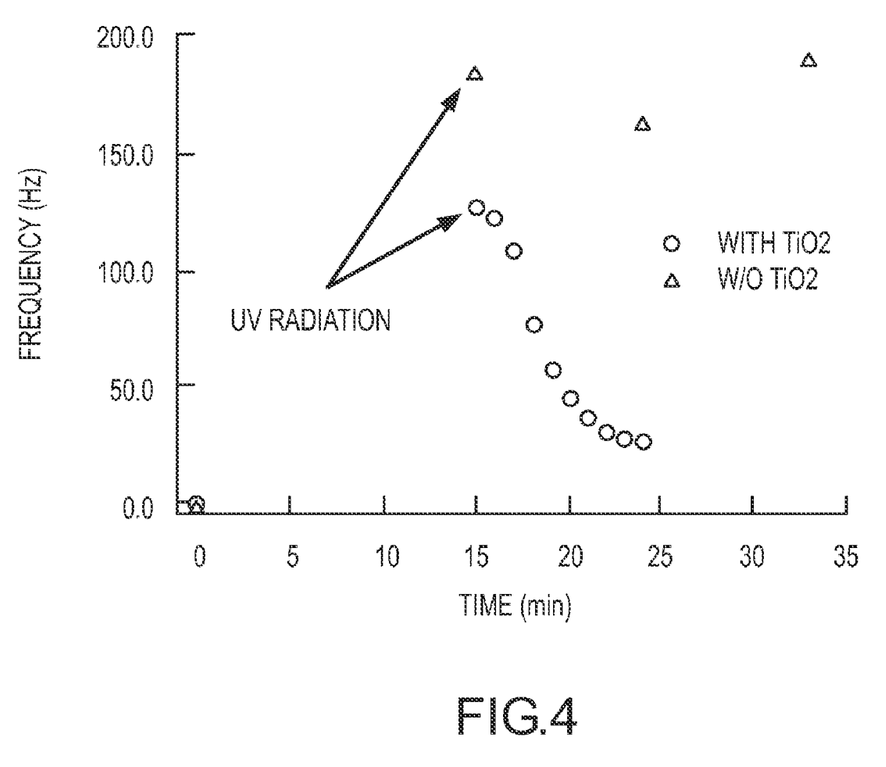
FIG. 4 is a graph showing frequency change (mass change) as a function of time for a pre-deposited film with UV radiation.

In this first example, a thin layer $TiO_2$ (photocatalyst, 2~40 nm) was coated on a TQCM surface, and organic contaminants were then deposited on the TQCM sensor with or without UV radiation. The deposition rate of the organics was monitored by recording the frequency change (i.e., mass change) of TQCM sensors. FIG. 3 shows typical TQCM results. As seen in FIG. 3, the rate of organics deposition on $TiO_2$-coated surface was significantly lower compared to that at the plain TQCM surface under UV radiation. These results suggested that $TiO_2$ coatings are effective in preventing organic residues, which are further supported by the fact that a significant increase in deposition rate was observed when no UV radiation was applied. In addition, the experiments also demonstrated that pre-deposited organic films on $TiO_2$ surfaces can be partially removed under UV illumination (FIG. 4). In this case, frequency decrease at the $TiO_2$-coated TQCM sensor with a thin organic film was observed upon UV radiation, which indicated the removal of such materials. On the other hand, significantly less change in frequency was seen for a plain TQCM (no $TiO_2$ coating) sensor under similar conditions. To investigate the effect of $TiO_2$ coating on the optical properties of the substrate, the absorption coefficient was measured as a function of $TiO_2$ thickness. The results showed that essentially no change was observed on substrates with such a thin $TiO_2$ coating. In summary, the test data obtained clearly indicates that $TiO_2$ coating is effective.

Example 2

Figure 5:
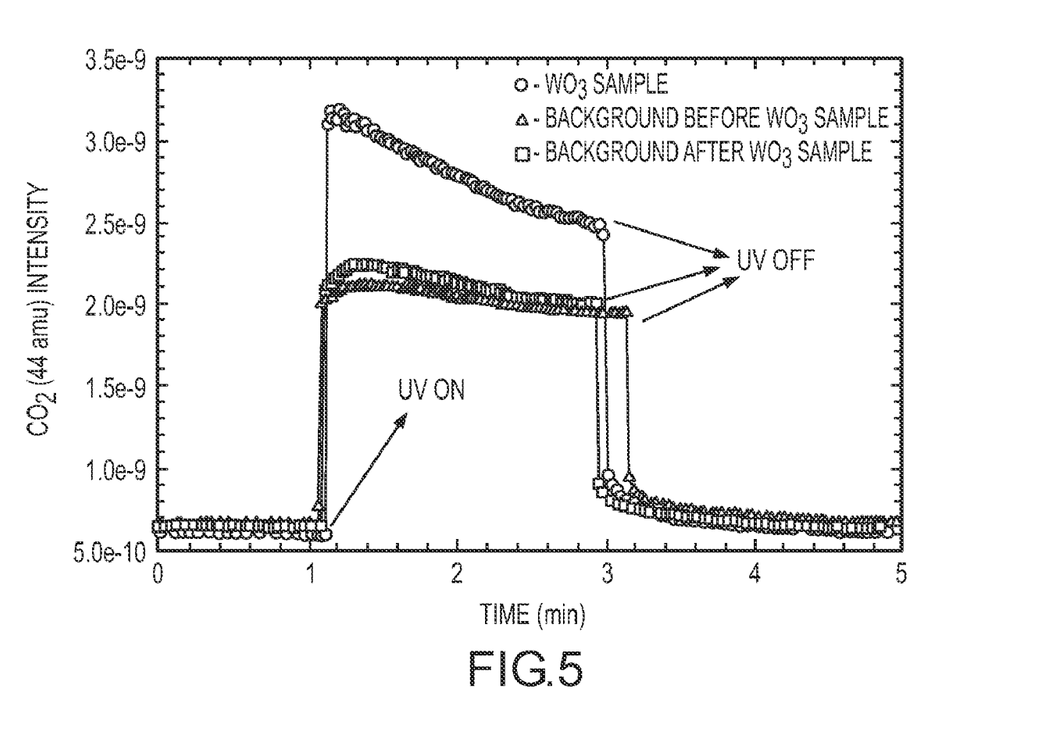
FIG. 5 is a graph showing $CO_2$ response as a function of UV radiation time illustrating the photocatalytical effectiveness of $WO_3$ in preventing and/or removing organics under vacuum conditions.

In this example, a thin layer of $WO_3$ (i.e., less than 200 nm in thickness) was coated on a quartz substrate, and organic contaminates (dioctyl phthalate) were then pre-deposited on the $WO_3$ surface. The test sample was then placed in an ultrahigh vacuum chamber (UHV, $10^{-10}$~$10^{-11}$ torr) and radiated with UV light. Mass spectrometry was used to detect potential decomposition products of the organic contaminants. For photocatalytic processes, one of the decomposition products is carbon dioxide ($CO_2$). The graph of FIG. 5 shows $CO_2$ response as a function of UV radiation time. Here, the circles denote a $WO_3$ sample exposed to UV radiation at $9\times10^{-10}$ torr. The triangles denote background condition (no sample) before $WO_3$ UV exposure. The squares denote background condition (no sample) after $WO_3$ UV exposure. As is seen in FIG. 5, a significant increase in $CO_2$ signal was observed compared to the background signal when the test sample was exposed to UV radiation. This demonstrates the occurrence of photocatalytic processes at the surface. The results revealed that $WO_3$ is photo catalytically effective in preventing and/or removing organics under vacuum conditions.

Example 3

Figure 6:
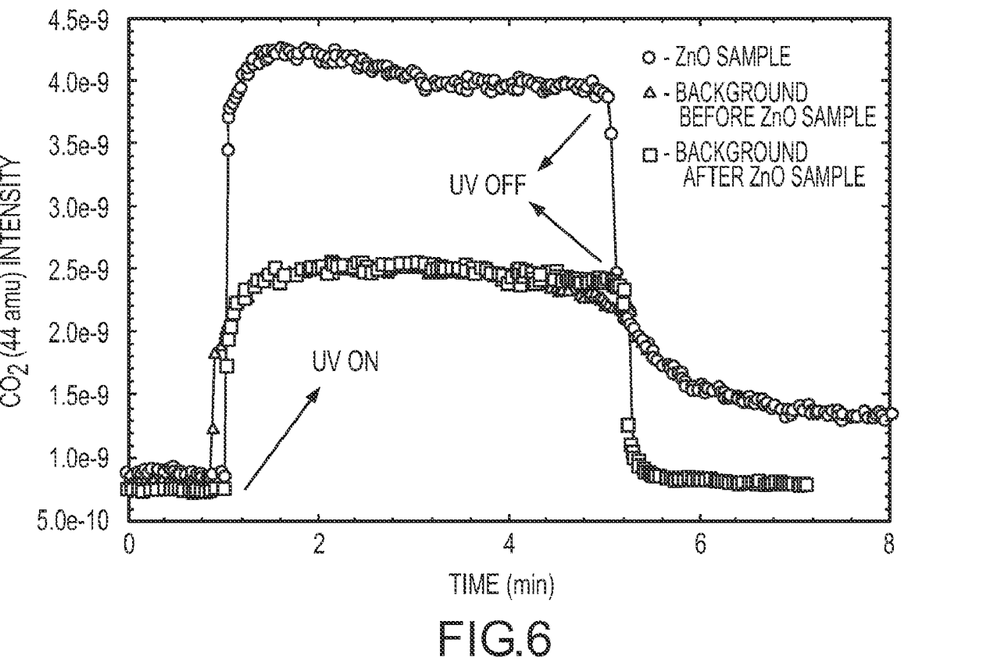
FIG. 6 is a graph showing $CO_2$ response as a function of UV radiation time illustrating the photocatalytical effectiveness of ZnO in preventing and/or removing organics under vacuum conditions.

In this example, a thin layer of ZnO (i.e., less than 200 nm in thickness) was coated on a quartz substrate, and organic contaminates (dioctyl phthalate) were then pre-deposited on the ZnO surface. The sample was then placed in an ultrahigh vacuum chamber (UHV, $10^{-10}$~$10^{-11}$ torr) and radiated with UV light. Mass spectrometry was used to detect potential decomposition products of the organic contaminants. For photocatalytic processes, one of the decomposition products is carbon dioxide ($CO_2$). FIG. 6 shows $CO_2$ response as a function of UV radiation time. Here, the circles denote a ZnO sample exposed to UV radiation at $8\times10^{-10}$ torr. The triangles denote background condition (no sample) before ZnO UV exposure. The squares denote background condition (no sample) after ZnO UV exposure. As is seen in FIG. 6, significant increase in $CO_2$ signal was observed compared to the background signal when the sample was exposed to UV radiation. This demonstrates the occurrence of photocatalytic processes at the surface. The results revealed that ZnO is photocatalytically effective in preventing and/or removing organics under vacuum conditions.

The above examples clearly indicate that other photoactive semiconductor materials in addition to $TiO_2$, $WO_3$, and ZnO, including but not limited to, $CaTiO_3$, $SnO_2$, $MoO_3$, $NbO_5$, $Fe_2O_3$, $Ta_2O_5$, and $Ti_X(Zr_{1-X})O_2$, where X has a value of between 0 and 1., and SiC, should prove effective in removing and/or decomposing organic materials from the substrate surface under vacuum conditions (e.g., space environment).

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method for inhibiting the formation of organic residues on the outer surface of a multi-layer thermal insulation blanket attachable on a structure intended for use in vacuum conditions, said method comprising the steps of:

coating an outer surface of an outer layer of the multi-layer thermal insulation blanket with a photocatalytic material, wherein the outer surface of the outer layer of the multi-layer thermal insulation blanket faces away from the structure when the multi-layer thermal insulation blanket is attached to the structure;

exposing the photocatalytic material coated outer surface of the outer layer of the multi-layer thermal insulation blanket to at least one of ultraviolet radiation and near-ultraviolet radiation to activate the photocatalytic material to catalyze the breakdown of organic residues on the outer surface of the outer layer of the multi-layer thermal insulation blanket; and overlaying the photocatalytic material coated outer surface with an outermost electrically conductive layer.

2. The method of claim 1 wherein in said step of coating, the photocatalytic material comprises a photoactive transition metal oxide.

3. The method of claim 2 wherein in said step of coating, the photoactive transition metal oxide is selected from the group consisting of $TiO_2$, ZnO, $WO_3$, $CaTiO_3$, $SnO_2$, $MoO_3$, $NbO_5$, $Fe_2O_3$, $Ta_2O_5$, and $Ti_X(Zr_{1-X})O_2$, where X has a value of between 0 and 1.

4. The method of claim 1, wherein the photocatalytic material coated on the outer surface of the outer layer of the multi-layer thermal insulation blanket has a thickness within a range of 2 nm to 200 nm.

5. The method of claim 1 wherein the structure comprises a spacecraft, and wherein said step of exposing comprises exposing the spacecraft to solar radiation in space.

6. The method of claim 1 wherein in said step of coating, the photocatalytic material is coated over an infra-red emittance layer on the outer surface of the multi-layer thermal insulation blanket.

7. The method of claim 6 wherein the infra-red emittance layer has an infra-red emissivity on the order of about 0.80.

8. The method of claim 6 wherein the infra-red emittance layer comprises at least one of quartz, glass, silicon nitride, and silicon oxy-nitride.

* * * * *